United States Patent [19]

Pickett

[11] Patent Number: 4,949,299
[45] Date of Patent: Aug. 14, 1990

[54] INDUSTRIAL CONTROL COMMUNICATION NETWORK AND METHOD

[75] Inventor: Dennis C. Pickett, Waukesha, Wis.

[73] Assignee: Allen-Bradley Company, Inc., Milwaukee, Wis.

[21] Appl. No.: 128,822

[22] Filed: Dec. 4, 1987

[51] Int. Cl.⁵ .......................................... G06F 15/46
[52] U.S. Cl. ............................... 364/900; 364/926.9; 364/927.92; 364/927.96; 364/949
[58] Field of Search ... 364/200 MS File, 900 MS File

[56] References Cited

U.S. PATENT DOCUMENTS

| | | | |
|---|---|---|---|
| 4,034,354 | 5/1977 | Simmons | 364/900 |
| 4,293,924 | 10/1981 | Struger et al. | 364/900 |
| 4,319,338 | 3/1982 | Grudowski et al. | 364/900 |
| 4,388,697 | 6/1983 | Breen et al. | 364/900 |
| 4,413,319 | 11/1988 | Schultz et al. | 364/200 |
| 4,442,504 | 4/1984 | Dummermuth et al. | 364/900 |
| 4,510,565 | 4/1985 | Dummermuth | 364/900 |
| 4,535,456 | 8/1985 | Bauer et al. | 371/16 |
| 4,667,323 | 5/1987 | Engdahl et al. | 370/85 |
| 4,748,620 | 5/1988 | Adelmann et al. | 370/94.1 |
| 4,774,656 | 9/1988 | Quatse et al. | 364/900 |

*Primary Examiner*—Raulfe B. Zache
*Attorney, Agent, or Firm*—Quarles & Brady

[57] ABSTRACT

A network consists of a programmable controller coupled to several sensors by an interface circuit. A common communication protocol is used to exchange messages containing commands and data between the devices coupled to the network. A protocol message packet has a header with fields for a task command, sensor identification, device status information and error codes. The header contains the same fields whether the message packet is for the interface circuit or one of the sensors connected to it. The headers for message packets going to and from the programmable controller and the interface circuit also have the same fields although the contents of the fields may vary depending upon the direction of the message packet. The message packet may also contain several data blocks each specifying a separate operation for the sensor to perform.

11 Claims, 6 Drawing Sheets

FIG. 3
DATA LATCH

SIGNALS AT FLIP-FLOPS 66 AND 70

FIG. 4

FIG. 5 COMMUNICATION PROTOCOL

INTERFACE MESSAGE ROUTINE

FIG. 8A
INTERFACE COMMAND ROUTINE

FIG. 8B

INDUSTRIAL CONTROL COMMUNICATION NETWORK AND METHOD

The present invention relates to industrial control systems such as process controllers and programmable controllers, and particularly to communication systems for operating and gathering data from remote sensor devices.

BACKGROUND OF THE INVENTION

Programmable controllers are typically connected to industrial equipment, such as assembly lines and machine tools. These special purpose computers sequentially operate the equipment according to a stored program. One such programmable controller is disclosed in U.S. Pat. No. 4,413,319. This type of controller includes an I/O scanner module that receives input data from numerous remote sensors via a common serial data link.

Originally the remote sensors were relatively simple devices, such as limit switches and other devices which produced a binary output that resembled a switch. As the need developed for more complex sensing functions, devices, such as temperature sensors, emerged which produce multiple bits of data representing the sensed conditions. These sensors produce blocks of data which have to be sent over the data link to the programmable controller for processing. Therefore, a communication system, such as taught by U.S. Pat. No. 4,413,319, was developed to transfer the blocks of data from the remote sensors.

As the industrial control technology evolved even further, the sensors became more sophisticated becoming programmable devices themselves. One type of these devices is radio frequency (RF) tag antennas, such as the Allen-Bradley Bulletin 2750 series. These "antennas" are transceivers which interrogate transponder tags fastened to objects, such as automobiles, as the objects move past the antenna on an assembly line, for example. Not only is the antenna programmable, but certain types of tags can be programmed with identification data by one antenna and interrogated to transmit the data to another antenna farther down the assembly line.

Quite often the process of obtaining data from one of these sophisticated sensors involved the programmable controller sending several operation commands to the sensor via the data link. For example, if a tag is to be programmed by an antenna, the first operation could be to notify the programmable controller when a tag is detected in the range of the antenna. The next operation would be to program the tag with data that accompanies the programming command. The final operation would be to read the tag and return the data to the programmable controller for verification that the tag was properly programmed. In conventional sensor networks, this procedure requires that three separate messages and three responses be sent over the data link.

Typically the sensor devices are not connected directly to the data link. Rather, an interface circuit is employed which often couples several sensor devices to the data link. The interface circuit handles the communication over the link and is programmed to translate the data message protocols of the data link and sensor devices. Therefore, a variety of sensor devices can be used and the sensor devices do not have to be designed for use with that particular data link protocol. Another complexity of conventional sensor networks is the use of different protocols for messages sent by the controller to either the interface circuits or to the sensor devices.

SUMMARY OF THE INVENTION

A communication network over which a computer gathers data from different sensors has an interface circuit for coupling the sensor to the network. The interface circuit receives a message packet from the computer and detects whether the message packet is addressed to it or one of the sensors coupled to it.

If the message packet is for a sensor, a plurality of sensor operations contained in the packet are stored in a memory in the interface. The operations are then sequentially sent to the sensor for execution. The interface waits for a reply that the previous operation has been completed by the sensor before sending it the next operation.

A general object of the present invention is to provide a system for sending and receiving data between a computer and one or more remote devices.

Another object is to have a communication system which transmits multiple operations to a remote device in a single message.

A further object is to provide a single message frame format for sending data and commands for ultimate use by either the interface circuit or a sensor.

Yet another object is to provide a single message frame format for sending messages from the computer to the sensor and responses from the sensor back to the computer.

DETAILED DESCRIPTION OF THE PRESENT INVENTION

Figure 1:
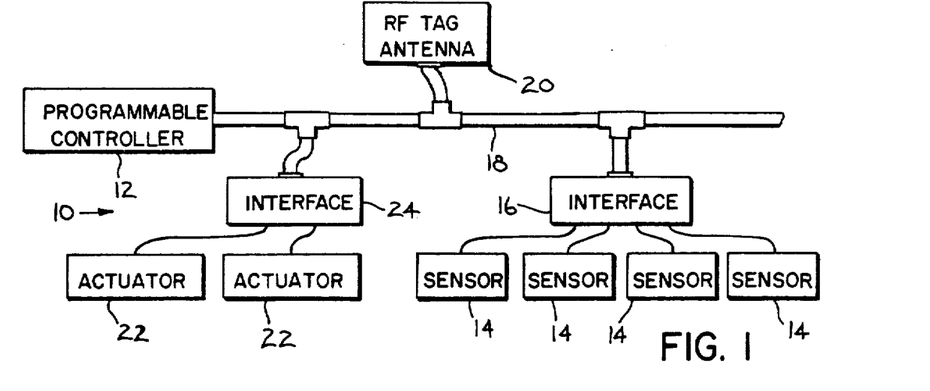
FIG. 1 is a diagram of a sensor communication network.

FIG. 1 illustrates a typical industrial control network 10 by which a programmable controller type computer 12 operates an assembly line. In performing its function, the programmable controller 12 gathers data regarding the events occurring along the assembly line and regarding the status of the different pieces of assembly line equipment. In the exemplary network, the data are provided by four sensors 14 which are coupled to the programmable controller 12 via an interface circuit 16 and cable 18. This particular network also includes an RF tag antenna 20 which in response to commands from the computer interrogates transponder tags (not shown) on the workpieces flowing down the assembly line. The RF tag antenna 20 has a built-in interface circuit which couples its RF sensing section to the network cable 18 and provides properly formated data signals to the network. The data gathered by the RF tag antenna 20 identifies the particular workpiece and perhaps its characteristics to the programmable controller 12. The RF tag antenna and other types of sensors execute their sensing function in response to a command from the programmable controller.

In the execution of its control program, the programmable controller 12 examines the data and sends output signals which place actuator devices 22 on the assembly line in various states. These actuator devices can include relays, motor controllers and solenoids. Another interface circuit 24 couples the actuator devices 22 to the network cable 18. Some of these actuator devices provide status information back to the programmable controller 12. Although the following description of the circuitry and operation of the present invention is in terms of communication between the programmable controller 12 and the interface 16 and sensors 14, it should be understood that it is equally applicable to communication with the interface 24 and its actuators 22, the RF tag antenna 20 and other sensor devices.

Interface Circuit Hardware

Figure 2:
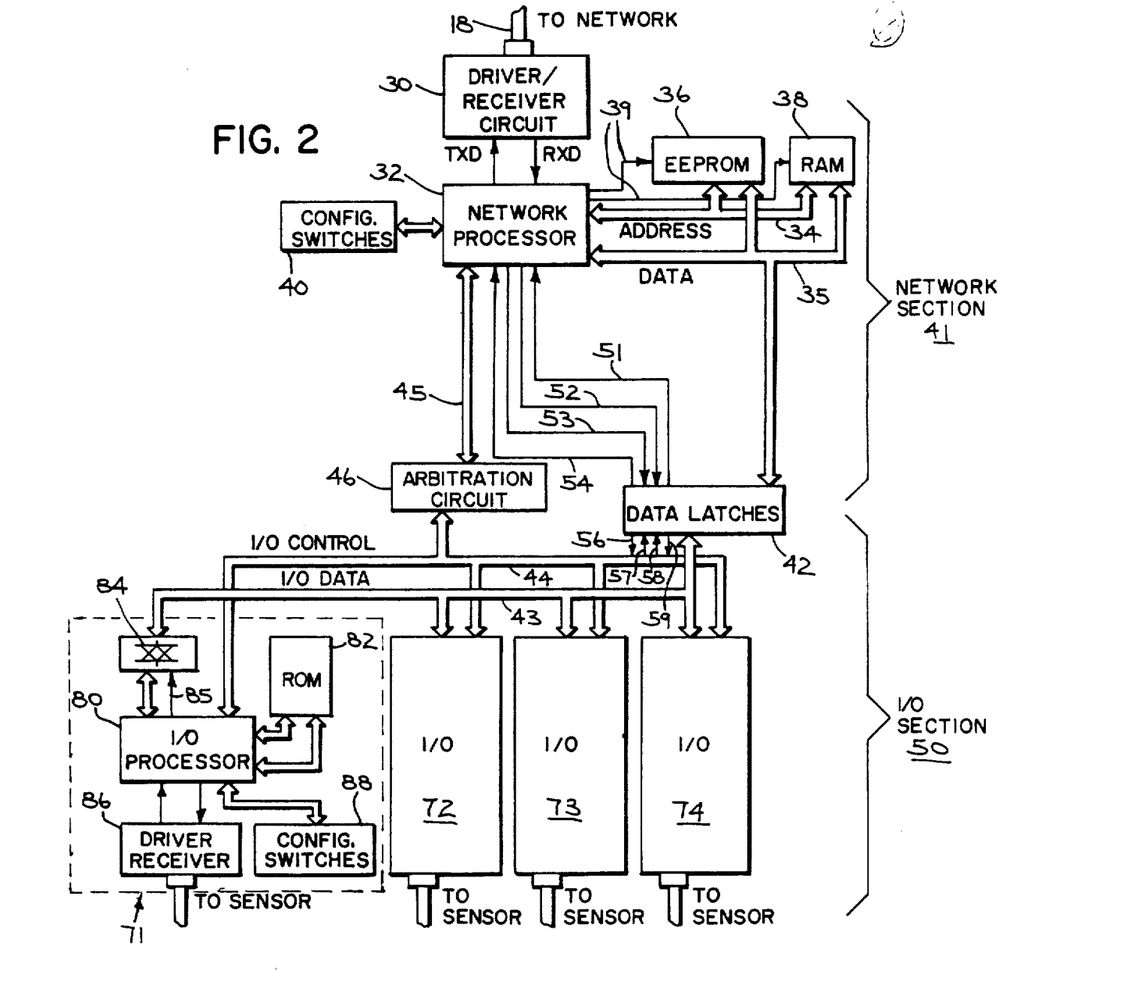
FIG. 2 is a schematic block diagram of an exemplary interface circuit for the network of FIG. 1.

Each of the interface circuits 16 and 24 provides bidirectional communication protocol conversion between the network cable 18 and the I/O devices, i.e. sensors and actuators. The detail of the sensor input interface circuit 16 are shown in FIG. 2. It should be understood that the present invention can be used with different types of interface circuits. The network cable 18 is connected to a serial driver and receiver circuit 30, which converts the internal signal levels of the interface circuit to the signal levels for the network cable and vice versa. The driver/receiver circuit 30 is connected to a serial data port of a network processor 32. The network processor may be any of several commercially available microprocessors, such as model 8344 manufactured by Intel Corporation.

The network processor 32 is coupled via an address bus 34 and a data bus 35 to an electrically erasable read only memory (EEPROM) 36 and a random access memory (RAM) 38. The EEPROM 36 provides non-volatile storage of configuration parameters for the interface circuit 16. Upon power up or resetting of the interface 16 the parameters are transfered to RAM 38 from which the network processor 32 examines them as needed by the program execution. The operation of the EEPROM 36 and RAM 38 is controlled by signals sent over sets of control lines 39. A set of configuration switches 40 is coupled to a port of the network processor 32. These switches 40 allow the manual setting of the interface's station address on the network cable 18, as well as selecting the serial signal standard, e.g. RS-232C or RS-422. The network processor 32 and its associated components form a network section 41 of the interface circuit 16 which provides the network serial interface, baud rate generation, port configuration control and some data buffering functions.

The data bus 35 is also coupled to a set of bidirectional data latches 42 which couple the data bus to an I/O data bus 43 within an I/O section 50 of the interface circuit. Four data latch status and control lines 51–54 connect the network processor 32 directly to the data latch 42. Another set of four status and control lines 56–59 couple the data latch 42 to an I/O section control bus 44. The data latches allow the components of the I/O section 50 to work asynchronously of the network processor 32 and still exchange data with that processor.

Figure 3:
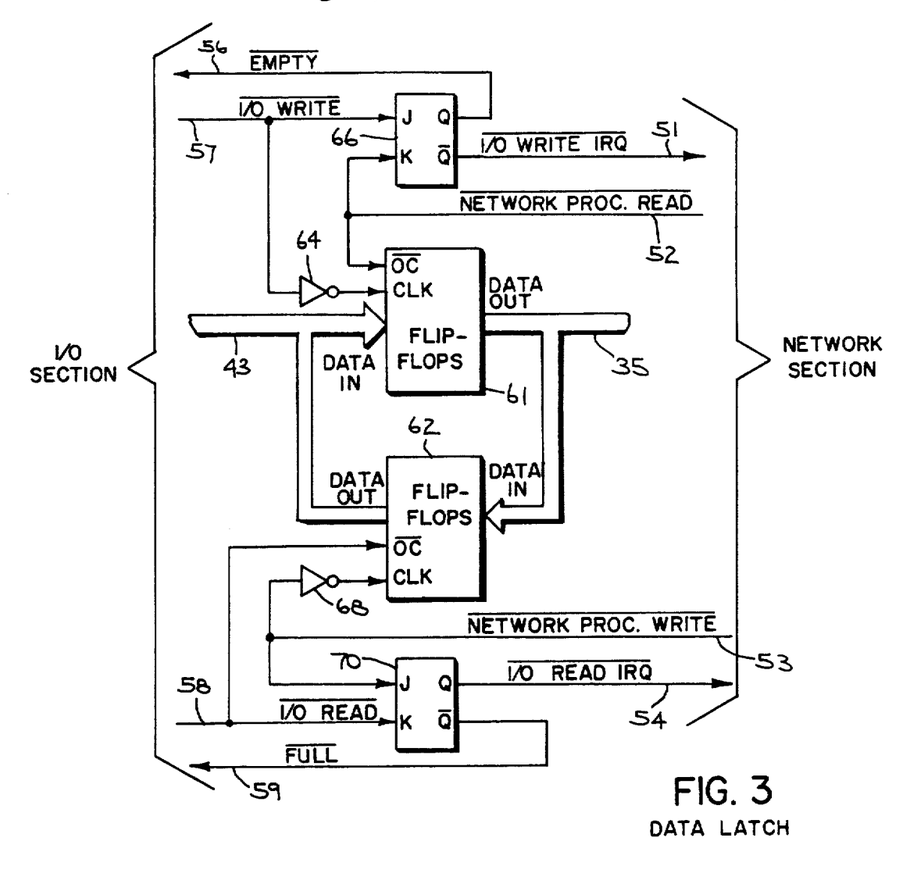
FIG. 3 is a detailed schematic diagram of the data latch shown in FIG. 2.

The details of the set of data latches 42 are shown in FIG. 3. The network section data bus 35 and the I/O data bus 43 are coupled by two sets of eight D-type flip-flops 61 and 62, such as SN74AS374 integrated circuits. The flip-flops of each set have tri-state outputs which makes them ideally suited for coupling to the data buses 35 and 43. The first flip-flop set 61 has each of its data inputs connected to a separate bit line of the I/O data bus 43 and its data outputs connected to separate bit lines of the network section data bus 35. The control line 57 from the I/O control bus 44 that carries the active low I/O section write signal is coupled via an inverter 64 to the clock input of the first set of flip-flops 61. The I/O section write control line 57 is also connected to the J terminal of a first J–K flip-flop 66. The control line 52 from the network processor 32 which carries the active low level data latch read signal is coupled to the output control terminal $\overline{OC}$ of the first set of flip-flops 61 and to the K terminal of the first J–K flip-flop 66. The Q output of the first J–K flip-flop 66 is coupled to the I/O section control line 56 to provide an active low signal indicating when the first set of flip-flips 61 are "empty," i.e. when their data has been read by the network processor 32. The not Q output of the first J–K flip-flop 66 is connected to status line 51 of the network section to provide an interrupt to the host interface processor 32 when the I/O section 50 has written data into the first set of flip-flops 61.

Similarly the second set of flip-flops 62 is coupled between the network and I/O section data buses to enable data to flow from the network bus 35 to the I/O bus 43. The network section control line 53 that carries the network processor write signal is coupled via an inverter 68 to the clock input of the second set of flip-flops 62. This control line 53 is also directly connected to the J input of a second J–K flip-flop 70. The control line 58 which carries the data latch read signal from the I/O section 50 is directly connected to the K input of the second J–K flip-flop 70 and to the output control input OC of the second set of flip-flops 62. The Q output of the second J–K flip-flop 70 produces an I/O read interrupt for the network processor 32 via line 54. The not Q output of the second J–K flip-flop 70 is coupled to the I/O status line 59 to provide an indication to the I/O section 50 when the second set of flip-flops 62 is full of data to be read by the I/O section.

The I/O section 50, FIG. 2, varies depending the type of input devices to be connected to the network. The interface circuit 16 has an I/O section 50 that comprises four identical sensor interface circuits 71–74, each of which couples one of the external sensors 14 to the network interface 16. The sensor interface circuits 71–74 provide the necessary communication protocol conversion to enable data to be exchanged between the network and the sensors 14. With specific reference to the first sensor interface circuit 71, each such circuit consists of an I/O processor 80, such as an 8031 microprocessor manufactured by Intel Corporation. The I/O processor 80 executes a control program that is stored in a read only memory (ROM) 82. A parallel port of the I/O processor is coupled to the I/O data bus 43 by a set of tri-state bidirectional data buffers 84 which are controlled by the processor via line 85.

The I/O processor 80 also has a serial I/O port coupled to a sensor driver/receiver circuit 86 which converts the I/O signal levels of the processor 80 to the proper levels for the respective sensor 14. These levels are defined by a set of configuration switches 88 connected to the I/O processor 80 in order to match the requirements of the particular sensor 14.

Each of the sensor interface circuits 71-74 is coupled via two different lines of the I/O control bus 44 to a data latch access arbitration circuit 46. Over one of these lines the sensor interface circuit 71-74 requests access to the data latches 42. When such access is granted to a given sensor interface circuit, its other line goes active informing it of the grant. The network processor 32 receives a notice as to which sensor interface 71-74 is sending it data via a signal on lines 45 from the arbitration circuit 46. When the network processor 32 is sending data to one of the sensor interface circuits 71-74, the interface circuit receives a data latch access grant signal even though it never requested the access.

Figure 4:
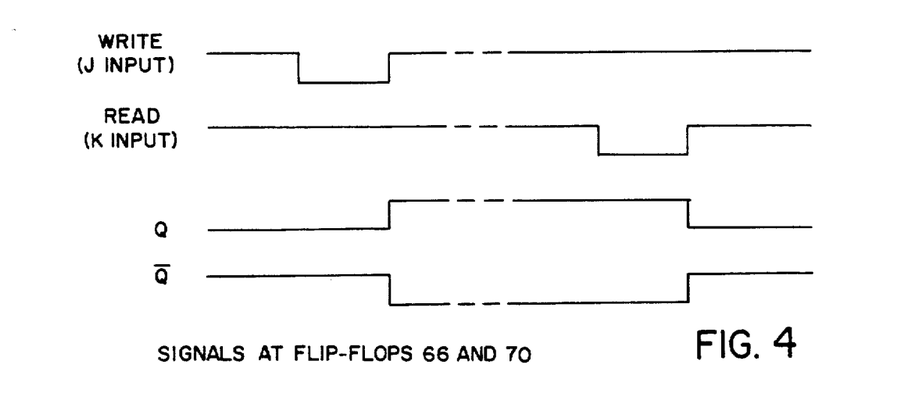
FIG. 4 is a timing diagram of the control signals of the data latch.

With reference to FIGS. 2 and 3, data is exchanged between the network and I/O sections 41 and 50 by storing each byte of data in the set of data latches 42. When a sensor interface circuit 71-74 is sending data to the network processor 32, it first checks the data latch EMPTY signal on line 56. If the signal is low, indicating that the latch is free, the sensor interface circuit enables its data bus buffer 84 and places a byte of data on the bus. The sensor interface circuit then asserts a low level I/O WRITE signal on control bus line 57. This signal clocks that data into the first set of flip-flops 61. The low I/O WRITE signal is also coupled to the first J-K flip-flop 66. The input and output signal waveforms for the J-K flip-flops 66 and 70 are illustrated by FIG. 4.

At the completion of the writing of the data into the first set of flip-flops 61, the WRITE signal goes high which toggles the outputs of the first J-K flip-flop 66. This produces an active low level I/O write interrupt (IRQ) from the not Q output on line 51 to the network processor 32 and a high level EMPTY signal from the Q output on line 56 back to the sensor interface circuit 71. The EMPTY signal will remain high (inactive) until the network processor 32 has completed reading the contents of the first set of flip-flops 61. In response to the low level I/O WRITE interrupt (IRQ), the network processor 32 will send a low level Network Processor Read signal to the data latch 42 over line 52. This low level signal on line 52 enables the tri-state output of the first set of flip-flops 61, thereby sending the stored data to the host interface processor over the network section data bus 35. The low level Network Processor Read signal does not affect the state of the first J-K flip-flop 66.

At the end of the data read cycle, the Network Processor Read signal goes high toggling the first J-K flip-flop 66. This toggling removes the low level I/O WRITE interrupt (IRQ) on line 51 from the not Q output and produces an active low level empty signal to the sensor interface circuit.

A similar operation occurs with respect to the second set of flip-flops 62 and the second J-K flip-flop 70 when data is sent by the network processor 32 to the sensor interface circuits 71-74.

As noted previously the interface circuit 16 couples the sensors 14 to the network cable thereby enabling data communication between the programmable controller 12 and the sensors.

Data Communication

In the course of the programmable controller 12 operating the assembly line, it gathers input data from the different sensors 14 and the RF tag antenna 20. In response to this data, the controller issues output data over the network 10 to control the state of the actuators 22. The set of programming rules for transmitting and interpreting the data signals sent over the network cable 18 is commonly referred to as the communication protocol. The protocol is typically broken down into several layers according to various functions. The communication over the network 10 involves three levels of implementation. The first one is the "link"layer which defines the hardware connection and includes the portion of the protocol that handles the transmission over the network medium (cable). The next level is the "network"layer which defines how the route between the sending and receiving devices is established. Finally, the "application"layer of the protocol provides properly formated data for the different sensors and actuators, as defined by their specifications.

Figure 5:
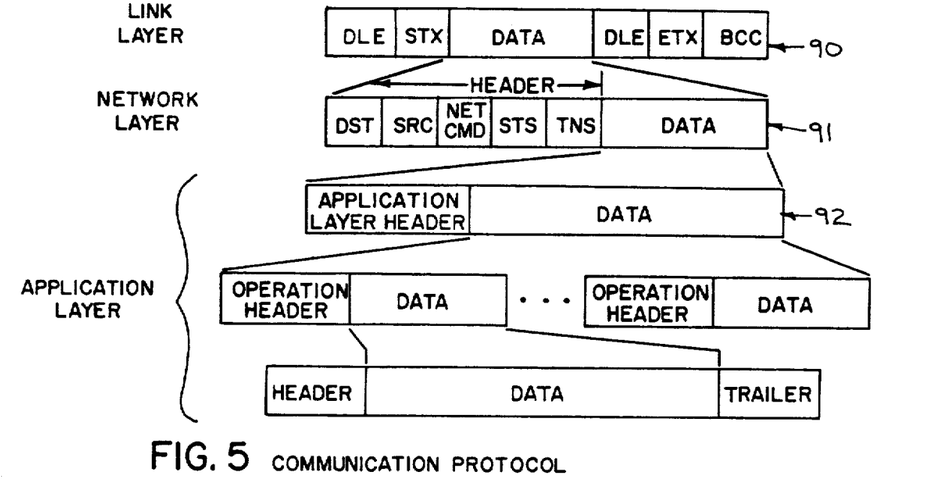
FIG. 5 is an illustration of the different layers of the communication protocol used with the present invention.

The transmission frame for the network data message is illustrated in FIG. 5 with the data field broken out to show the message packet for each of the three protocol layers. The link layer utilizes a full duplex communication protocol that resembles the American National Standards Institute (ANSI) specification X3.28- 1976. This layer combines the subcatagories D1 relating to data transparency and F1 regarding two-way simultaneous communication. As this is a well-defined standard, it will not be described in detail.

The message packet 90 for the link layer shown at the top of FIG. 5, begins with a delimiter character (DLE) immediately followed by a start of message character (STX). As used herein a character refers to a byte of data. Next is the data field which in this implementation is followed by another delimiter (DLE) and an end of text character (ETX). The last character of the link layer message packet 90 is a block check character (BCC), which is conventionally derived from the values of the data field characters to check the accuracy of the message packet transmission.

The link layer provides the necessary delineation of the message to enable each of the network stations, e.g. interfaces 16 and 24, RF tag antenna 20 and the programmable controller 12, to recognize each message packet that is carried over the cable 18. Each station upon receiving a link layer message packet 90 inspects the data field in order to determine if the message is for it.

The data field of the link layer packet 90 contains the network layer message packet 91 as illustrated by the next level of FIG. 5. This packet 91 begins with a header that contains information necessary to route and process the packet. The first byte (DST) of the header contains the number of the destination station for the message and a byte denoting the sending station's number (SRC). The next byte of the network packet header is a network command. The high nibble (i.e. the most significant four bits) of the command in the message from the programmable controller is defined as always being zero. The low nibble (i.e. the least significant four bits) specifies the command. These commands are used to test the network and to place the interfaces in different modes of operation. When the recipient station replies to a command, the lower nibble of the command byte remains the same, but the value of the higher nibble is changed to four to denote the message as a reply.

In such replies, the next byte (STS) indicates the status of the transmission. A non-zero value indicates an error. The high nibble of the status byte (STS) denotes an error which occurred in the network communication. These errors include incorrect message length, invalid command and invalid network address. The low nibble indicates an error in the interface's delivering the data portion of the network packet to the sensor.

Following the status field in the network layer header are two bytes which contain a unique transaction identifier number (TNS) that is assigned by the the initiator of the message (programmable controller 12 or one of the interface circuits 16, 20 or 24). The transaction number (TNS) along with the destination and sending station numbers (DST and SRC) provide a unique identification for every message packet in transit. The transaction number distinguishes among several messages for the same station (interface). Following the network packet header is a data field up to 242 bytes long. This field contains the application layer message packet 92 which provides a command designating a task for the interface or a specific sensor device.

Although the link and network layers described above are used in the current implementation, other protocols may be used for these layers which serve to get the application layer data packet to the correct network station. The present invention involves the application layer of the communication protocol and provides a system that is uniquely suited to exchanging data with intelligent sensing devices 14 and 20.

Figure 6:
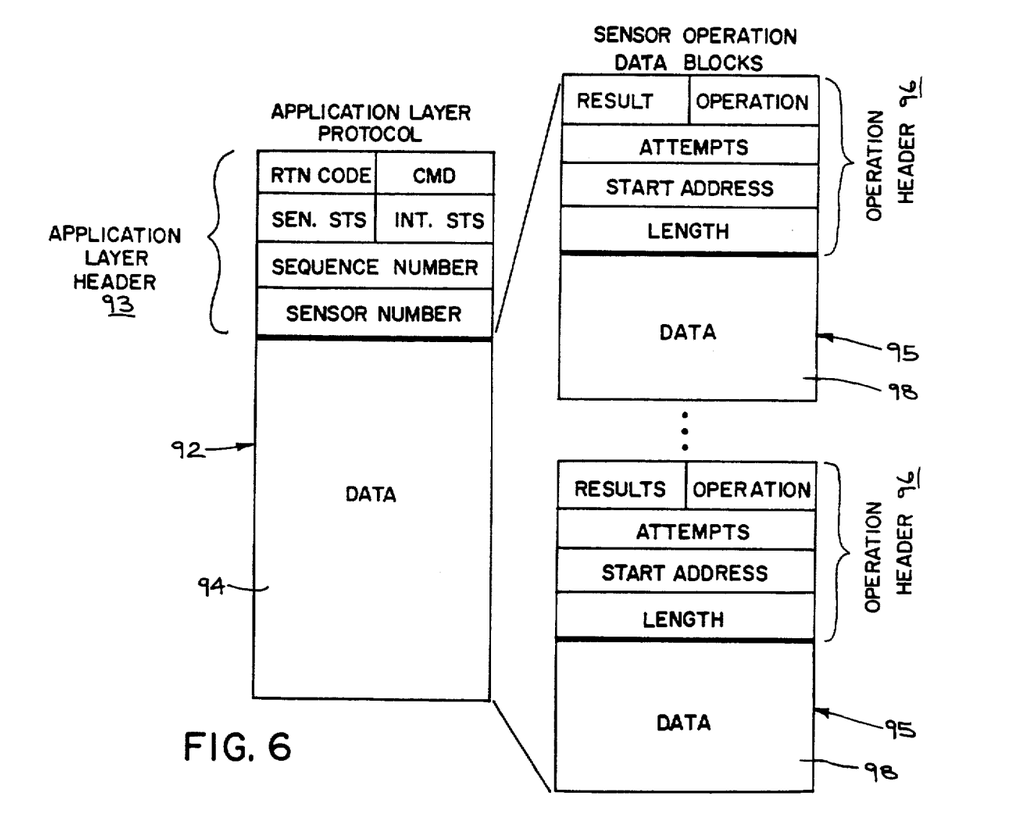
FIG. 6 is a detailed illustration of a portion of the application layer of the protocol depicted in FIG. 5.

The application layer message packet 92 and its subpackets are shown in more detail in FIG. 6 and reference should be made to the latter figure with respect to the following description. The application layer message packet 92 specifies a task to be performed by either a network interface 16 or one of the sensors 14. This layer's message packet contains a task command and any data needed to carry out the task. If the message is for a sensor 14 the interface 16 processes the application layer message packet 92 and forwards the task command and data to the sensor. The format of the application layer packet 92 is the same regardless of whether it is intended for the interface or the sensor. In addition the format is the same for commands to these devices from the programmable controller 12 and for their responses.

As shown on the left side of FIG. 6, the application layer packet 92 consists of a header 93 and a data field 94. The application layer header 92 consists of four sixteen bit words represented by each horizontal line of the header as illustrated. The first word of the header 92 includes a byte wide field for a return code (RTN) which indicates a successful completion of the task or the reason for a failure of the task's execution. This field is filled in when the interface or the sensor responds to a task. This byte is set to zero upon successful handling of the message. The return code byte (RTN) represents the occurrence of an error, such as Data Buffer Overflow, Invalid Sensor Number, Invalid Command, Insufficient Data, or Device Busy.

The other byte of the first word contains a command identifying the task for the interface or a sensor. The first nibble indicates whether the command is for the interface 16 or one of the sensors 14 and the second nibble specifies the task to be performed. The first task is ECHO which specifies that the received message is to be sent back to the sender station. This process is used to test the communication link. The RESET task command reinitializes the sensor or interface using default configuration parameters. Another command directs the interface or the sensing device to perform an internal diagnostic routine and report the results to the programmable controller 12. The sensor or interface also can be interrogated to obtain their configuration parameters with one set of commands and another set of commands downloads these parameters from the programmable controller 12 into the devices. Among other things, these configuration parameters define the how communication over the network and between the interface and each sensor is to be carried out. The most commonly used task command causes the designated sensor 14 to perform the operations specified in the application layer packet data field 94 and return the results. Typically, this directs that the sensor perform one or more read or write operations.

The second word of the application layer header 92 provides status information in the response message regarding the state of the sensor and the interface. The first byte contains the sensor status. The setting of these bits indicate different errors or equipment failures of the sensing device. The function of each bit varies depending upon the specific errors indicated by the particular device. The interface software merely gathers the status data from the sensing device and transmits it to the programmable controller 12 in this byte. Similarly, the second status byte indicates errors which occur in the interface circuit 16. These errors include communication failure with the controller, memory checksum errors, buffer overflow, and data processing errors.

The third word of the application layer header 93 provides a field for a message sequence number which is an arbitrary sixteen bit number assigned by the station that initiated the message. For example, this number is used by the equipment control program of the programmable controller 12 to match responses to pending commands when there are multiple commands outstanding. The final header field word contains the logical number or address of the sensor device when the task is for a sensor.

As noted briefly above, the application layer message packet has a fixed length regardless of the type of header message or whether it flows to and from the sensing device or interfaces. The packet from the programmable controller to the sensing device has all zeros or extraneous data in the return code, device status and interface status fields. Real data is inserted in these fields in the reply message from the interface. If the command is directed to the interface 16 for execution, the sensor number field will also be all zeros.

Although the header 93 of the application layer packet 92 has a fixed length and uses the same data fields for the various types of messages, whether or not a data field 94 is included and the length of the data field will depend on the type of message. For example, data is not required for the reset, diagnostic, get sensor data and return configuration parameters commands. Therefore for the application layer message packets 92 for theses types of commands do not contain the data field 94. Similarly the response application layer message packet 92 in reply to a set configuration parameters command does not include a data field 94.

Although the length of the application layer packet 92 varies from message to message, the interface 16 is able to determine its length in order to process the message. Specifically, as the message frame 90 is being received, the link layer communication program for the network processor 32 is counting the number of bytes being received. This enables the network processor 32 to determine the length of the link layer message packet data field. By subtracting the length of the header for the network layer packet 91 from the length of the link layer data field length, the length of the application layer packet 92 is computed. This length indicates whether a data field 94 is present in the application layer packet 92 and how large it is.

When the interface 16 formulates and sends its reply to the task, the return code, device status and interface status fields in the application layer header 93 are filled in with the data described above. The sequence number and sensor number fields remain the same as in the received command packet. The command field, however, is changed to indicate a reply message. This is accomplished by changing the high nibble to a nine if the reply is to an interface command or to an eight if it is a sensor reply, for example. The low nibble remains unchanged and indicates the type of command that initiated the response. The data field 94 of the reply typically contains the data from the sensing device 14. However, this field is eliminated for replys to the reset, and set interface or sensor configuration parameters.

The interface 16 to which the message is addressed in the network layer inspects the header of the application layer packet 92. Specifically, the application layer processing software routine in the interface 16 examines the command field to determine if the command is for the interface or a sensor. If the command is for the interface, the interface begins executing the command. If, however, the command is directed to a sensor 14, the interface software routine examines the sensor number field to determine for which of its sensors the message is intended.

If the application layer message packet 92 contains a task for one of the sensors to perform, the sensor operation data block 95 (FIG. 6), contained in the data field of the application layer message packet are sent to the sensing device. These data blocks specify various operations to be performed in carrying out the designated task. For example, if the task involves the RF tag antenna 20 programming a tag, the operations include sensing the presence of a tag, loading data into it and reading back the data to verify its proper storage.

Each of the operation data blocks 95 contains its own header 96 and a data field 98 as illustrated on the right side of the FIG. 6. The first word of the operation header 96 has a byte for the result from the operation, which byte is all zeros in the message to the sensor. In the response to the operation packet, bits in the results field are set to indicate various sensor related conditions such as operation timeout, operation failed, RF tag detected, low battery, or invalid operation. The operation to be performed, typically either read or write, is specified in the second byte of the first word.

The second word of the operation header, designated "attempts", is usually zero in the operation message to the sensor. However, it may contain the number of seconds to wait during the operation processing. In the case of a sensor read operation, if sensor data is not received by the interface in the specified wait time, a response is returned to the programmable controller with a result field bit set indicating a timeout had occurred. In the case of a sensor write operation, the interface waits for the specified time before sending a response or continuing on to the next operation. In the reply message to the programmable controller, the attempts field contains the number of times the sensor performed the operation before satisfactorily completing it or giving up.

The start address field of the operation header 96 is employed where the data being sent to or from the sensor cannot fit within the data field 94 of a single application layer message packet 92. In this situation, the data is divided among several application layer message packets. The data block address field in these packets contains the address offset of the location in the sensor's memory where the data in this packet will be stored. The length field specifies the number of bytes of data read from the sensor or to be written into it. This field is followed by a data field 98 containing the actual data read from or to be written into the sensor.

Figure 7:
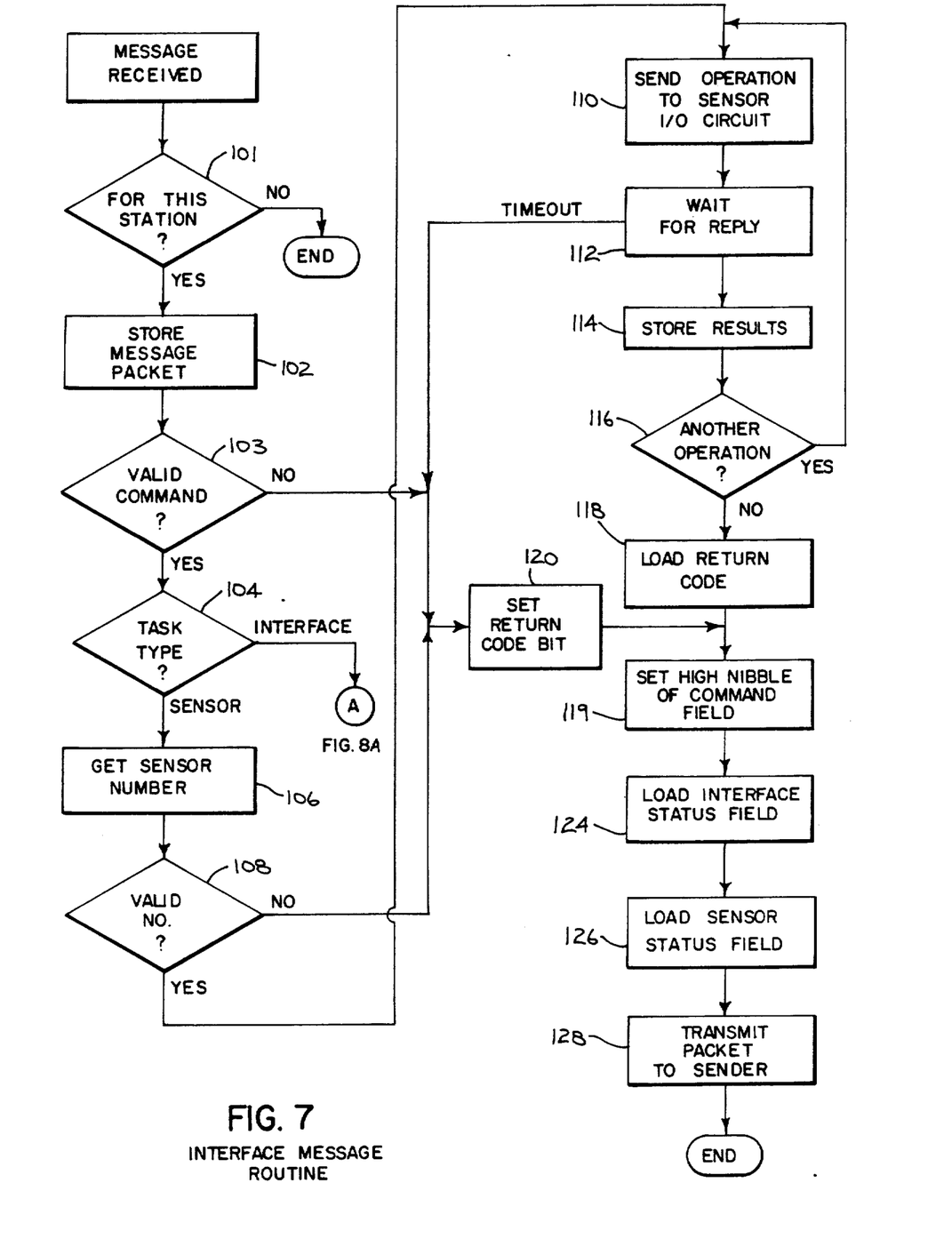
FIG. 7 and 8A and 8B are flow charts of the program to process message packets sent using the present protocol.

With reference to FIGS. 1 and 2, when the programmable controller 12 seeks to issue a command or download configuration data to the interface 16 or the sensor devices 14, it formulates the message packet as previously described. The message is then transmitted by the programmable controller 12 over the network cable 18. Each of the separate interface circuits 16 and 24 as well as the dedicated interface circuit within the RF tag antenna 20 receive all of the data messages transmitted over the network 10. For example, with respect to the circuit for the sensor interface circuit 16 shown in FIG. 2, the serial interface 30 converts the signal present on the network cable 18 into a signal having the proper levels to interface directly into the network processor 32. A conventional communication routine is shown by flow chart of FIG. 7, is executed by the network processor 32 to handles the link layer packet 90. This routine examines the destination station field (DST) within the network layer packet's header to determine whether the message is for that particular interface. At the initial step 101, if the routine determines that the message is not for this particular interface, no further processing of the message is conducted.

If, however, the message is for the particular interface circuit, the network layer packet 91 will be stored in RAM 38 of the network section at step 102. Once the network layer packet 91 has been received and stored, the data field will be dissected and the application layer packet 92, shown in FIG. 6, inspected by the network processor 32. Specifically at step 103, the command contained within the application layer header 93 is inspected to determine whether it is one of the valid commands for the protocol. If the command is not valid, the program advances to step 120 at which a bit within the return code field (RTN) of the packet stored in RAM 38 is set to indicate that invalidity. The program then advances to step 119.

If a valid task command has been found at step 103, it is inspected at step 104 to determine whether it is for the interface 16 or one of the sensor devices 14 connected to the interface. Assuming that it is for one of the sensors, the sensor number field within the application layer header 92 is inspected to determine which of the sensors is to perform the task. A verification that the sensor number is valid is conducted at step 108 and if an invalid sensor number for this interface circuit is found, the program branches to step 120 where the appropriate bits of the return code field are set.

However, if the sensor number is valid, the appropriate information is sent to the sensor interface circuit 71–74 for that sensor, for example circuit 71. The information transferred depends upon the nature of the task to be performed. For example, the reset or get configuration parameters tasks require a single operation that does not send data to the sensor. Therefore for these tasks only the task command needs to be sent to the I/O interface circuit 71. When the sensor's parameters are to be set, both the command and the parameter data in the packet's data field 94 have to be transferred to the I/O interface circuit 71. If the task is to perform one or a series of sensor operations, then the information in the data block 95 must be transferred from the network section RAM to the I/O interface circuit 71. If a series of operation data blocks are contained in the message packet, each one is sequentially sent to the I/O interface circuit after a response to the previous one is received by the network processor 32. This transfer of the appropriate information for the task occurs at step 110.

When the appropriate I/O interface circuit 71 receives the task information, it begins executing a sensor communication program to instruct the corresponding sensor to carry out the task. This program is customized for the specific sensor being controlled and interprets the command or operation byte from the application layer message packet 92 to generate the specific set of sensor instructions for the designated task or operation. These instructions along with any data from the message packet are sent by the I/O interface circuit 71 to the sensor 14.

The message handling routine of the network processor 32 then enters a wait state at step 112 for a reply to be received from the sensor 14. While in this wait state the network processor 32 may conduct other communication tasks, such as issuing tasks to other sensors or communicating their results to the programmable controller 12 via the network. If a predetermined amount of time expires without a reply being received at step 112, the network processor 32 exits the wait state and the program branches to step 120 for the appropriate error bit to be set in the return code.

Assuming that the sensor was instructed to perform one of several operations specified in the data blocks, when the sensor 14 has completed the designated operation, the results are transmitted back to the corresponding I/O interface circuit 71. Once all of the results have been stored in the memory of the I/O processor 80, they are transfered to the network section 41. The process by which data is exchanged between the I/O section 50 and the network section has been described above with respect to the interface circuit hardware. At step 114 of the network section's message handling routine in FIG. 7, the network processor 32 begins storing the results from the sensor 14 into the data block 98 of the application layer message packet stored within network section RAM 38. Additional data is provided by the corresponding I/O interface circuit 71 regarding the sensor status and whether any errors occurred in the performance of the designated operation. These data are stored in the results and attempts fields of the operation data block header 96. Additional information regarding the sensor's status is then stored in the corresponding block of the application layer header 93.

Once all of the results from the particular operation have been stored in the designated locations of the network section RAM 38, the most significant bit of the operation field of the previous operation data block is inspected at step 116 by the network processor 32 to determine if it is set, thereby designating that another operation data block exists within the application layer message packet 92. If another operation data block exists, the program returns to step 110 where the next data block information is sent to the designated I/O interface circuit 71. This process is repeated until at step 116 a determination is made that the most significant bit of the operation field is not set, indicating that it is the final operation for that application packet.

Upon this occurrence, the program advances to step 118 where the return code field within the application layer header 93 is loaded with the appropriate error bit indication. Next at step 119 the network processor changes the high nibble of the command field to nine to indicate a sensor task response. Then at step 124, the current interface status is entered into the interface status field of the application layer packet header 93 stored in RAM 38. The sensor status is then obtained from the I/O interface circuit for that sensor and is stored in the corresponding field of the application layer header at step 126. Then the network processor 32 then transmits the response packet back to the programmable controller at step 128.

Figure 8A:
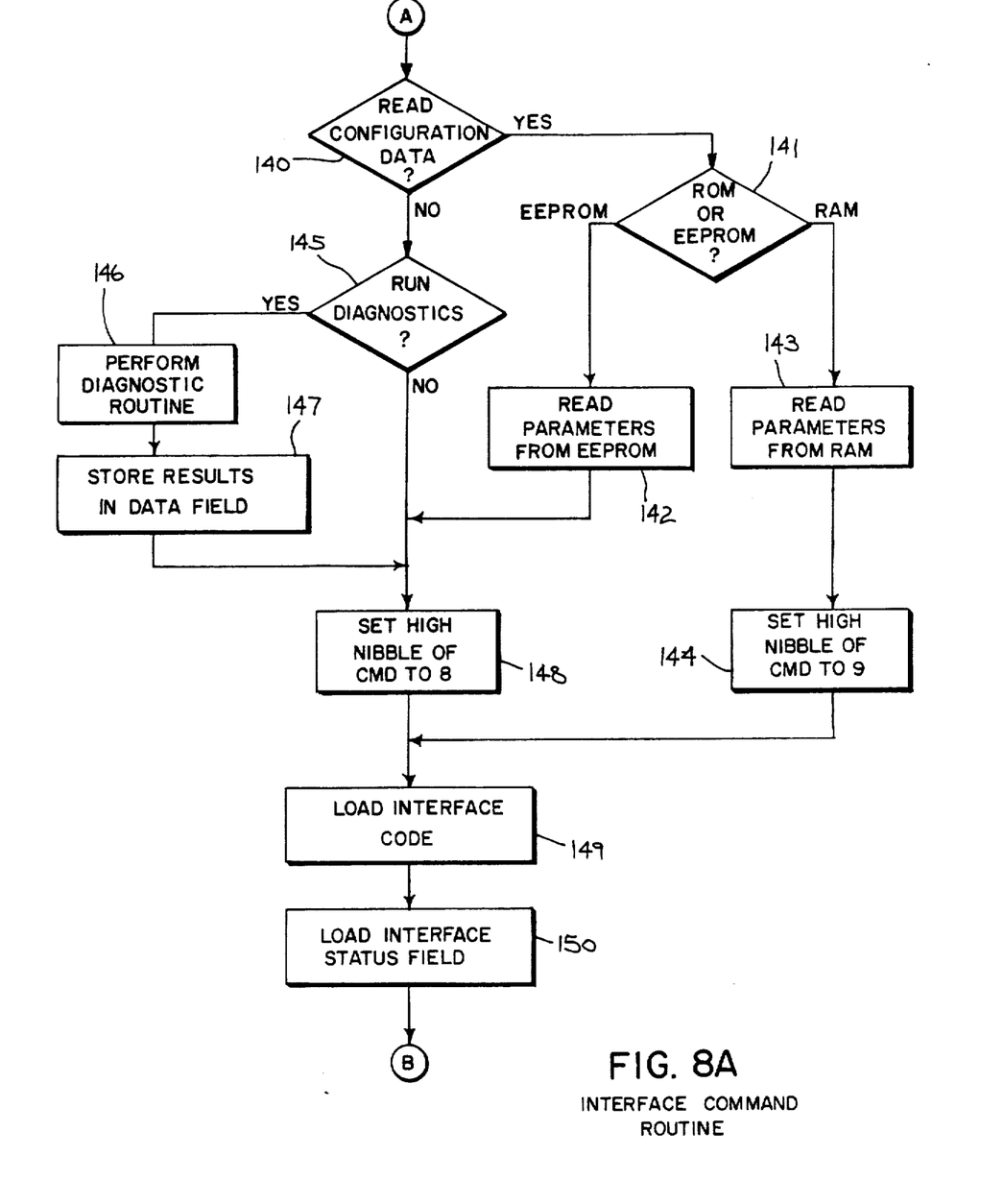
Figure 8B:
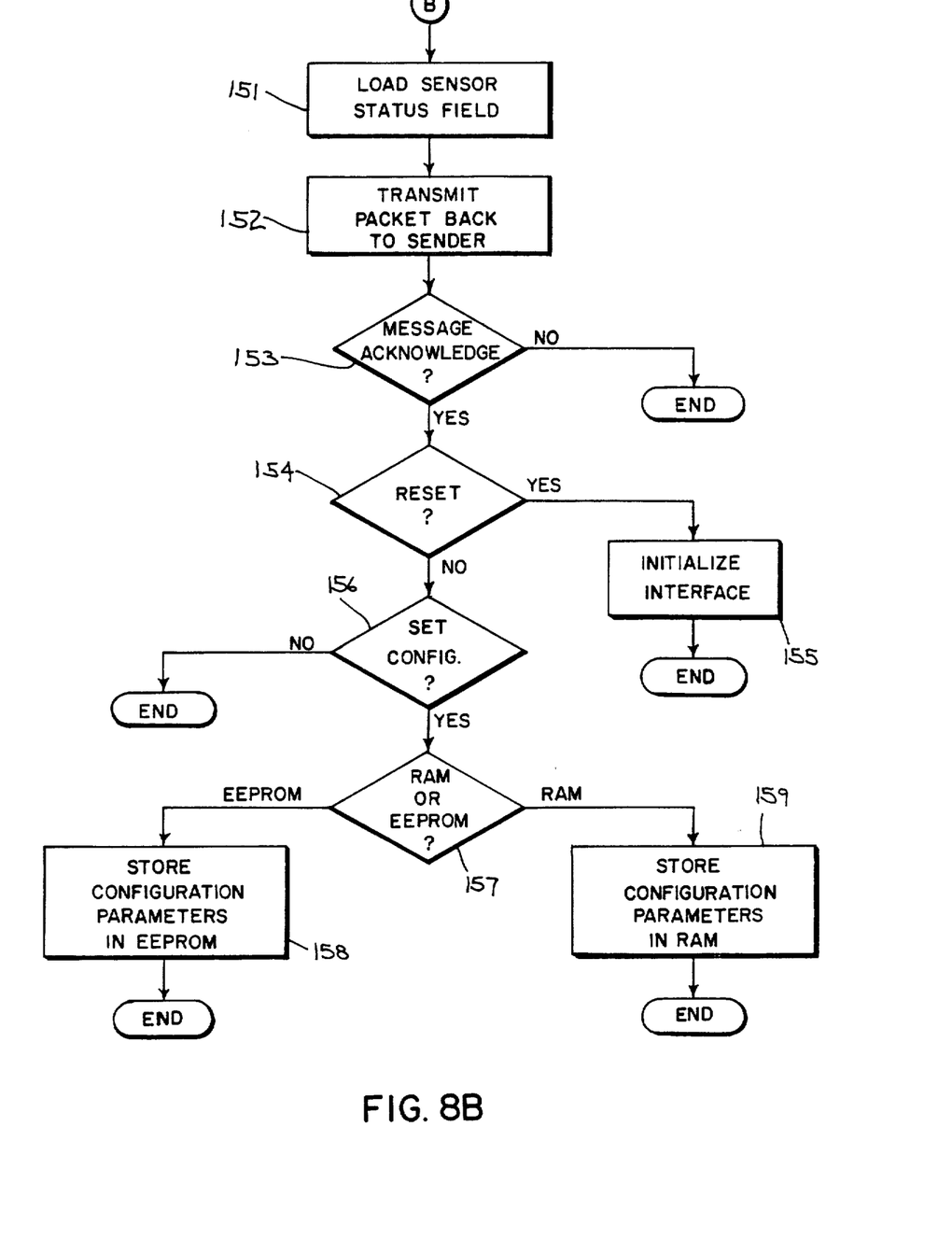

As noted above, if the task is determined at step 104 to be for the interface 16 rather than a sensor 14, the program branches to the routine shown on FIGS. 8A and B. For this portion of the message handling routine, the network processor 32 executes the task commands that are designated for the interface circuit 16. The task command specifies the particular function to be performed such as resetting the interface, executing a diagnostic routine, reading or setting the interface communication parameters or merely echoing the message back to the sender.

The routine begins at step 140 on FIG. 8A where the network processor 32 examines the command to determine if it is requesting that the interface configuration data be read and sent back to the message initiator. If so, the program branches to step 141 where the specific command is inspected at step 141 to determine whether the configuration data is to be obtained from the RAM 38 or the EEPROM 36. As noted above, when the interface circuit 16 is initially powered up or a reset, the parameters stored in the EEPROM 36 are transferred into a corresponding data area of RAM 38. During the execution of the control program by the network processor 32, when the various configuration parameters are required, the network processor 32 will obtain these from the RAM 38. The actual parameters stored as the working copy in RAM 38 may be altered from the parameters stored within the EEPROM 36. Therefore, the programmable controller 12 may seek to read the configuration parameters that are currently stored in either RAM 38 or EEPROM 36. If the command instructs that the configuration parameters in the EEPROM are to be obtained, the configuration parameters are read out at step 142 and stored in the data field 94 of the application layer message packet for transmission. The program then advances to step 148. If, however, the configuration data is to be obtained from the RAM 38, these parameters are read at step 143 and assembled into the data field 94 of the application layer packet. The program advances to step 144 where the network processor 32 sets the high nibble of the command field within the application layer header 93 to the number nine designating that the data has been obtained from RAM 38 rather than EEPROM 36. The program then advances to step 149.

If the command does not instruct the reading of configuration data, the program advances from step 140 to step 145 where the diagnostic command is detected. If the command calls for the interface to execute its internal diagnostics, the corresponding diagnostic routine is run at step 146 and the results are stored within the data field of the application layer packet at step 147 before advancing to step 148.

The network processor 32 at step 148 sets the high nibble of the command field within the application layer header 93 to the value of eight so that it indicates the completion of the command. At step 149 the interface sets the return code field is loaded with the appropriate error bits. The interface status and sensor status fields are then loaded with the appropriate data at steps 150 and 151 (FIG. 8B). The response data message is then transmitted back to the programmable controller over the network 10 at step 152. Thus, a message is always returned to the initiator, even if the command does not require reply data. The network section 41 of the interface circuit 16 then waits at step 153 for an acknowledgment that the transmission was received. If an acknowledgment is not received within a prescribed interval, the interface command routine ends.

If however, an acknowledgment of the transmission is received, the program advances to step 154 on FIG. 8B. At this juncture, the network processor examines the command to determine if it is designating a resetting of the interface circuit 16. If a reset is to take place, the program branches from step 154 to step 155 where the interface circuit 16 is initialized to begin executing its programs with the current configuration settings and parameters. The interface command routine then ends.

If a reset command is not detected as step 154, the program execution advances to step 156 to check whether the configuration parameters are being downloaded from the programmable controller 12 into the interface circuit 16. If this is not the case, the routine ends when one of the downloading commands is found at step 156, it is further inspected at step 157 to determine if the parameters are to be stored in RAM 38 or EEPROM 36. If the parameters are for the EEPROM 36 they are transferred from the message packet data field 94 stored within RAM 38 into the corresponding section of the EEPROM at step 158. The interface command routine then ends.

If at step 157 the download command designates the storage of configuration parameters in RAM 36, the program branches to step 159 where the parameters are transferred from the data field of the application layer packet 94 that is stored within one portion of RAM 38 into another portion of the RAM that stores the configuration parameters for the interface circuit 16. Once this has been accomplished, execution of the routing is complete.

The interface message handling and command processing routines of the flow charts in FIGS. 7 and 8 do not contain check steps at which different error conditions in the processing are detected. It is well understood by those skilled in writing control programs for programmable controller systems that at various points in these routines, errors must be detected and the corresponding bits of the interface status field have to be set to provide an indication of the fault condition to the programmable controller 12.

What is claimed is:

1. In a communications network in which a computer gathers data from different sensor devices over a cable, the improvement comprising an interface circuit coupling a sensor device to the cable, said interface circuit including:

means for receiving a message packet from said computer, said packet containing a plurality of operation commands for the sensor;

means for storing the plurality sensor operation commands received by said means for receiving;

means for sequentially sending data from each stored sensor operation command to the sensor device;

means for storing data from the sensor device in response to each sensor operation command; and means for transmitting the response data to the computer.

2. The network in claim 1 wherein said interface further includes means for coupling a plurality of sensor devices to said interface.

3. The network as recited in claim 2 wherein said interface further includes means for determining from said message packet for which sensor device the packet is intended.

4. A method for controlling a remote device via a communication network comprising the steps of:

(a) transmitting a first message packet from a controlling apparatus over the network, the packet having a header and a plurality of data blocks specifying operations to be performed by the remote device;

(b) storing the plurality of operation data blocks transmitted over the network in an interface circuit connected to the network and to the remote device;

(c) sending a command regarding the operation specified by one of the stored operation data blocks, from the interface circuit to the remote device;

(d) upon the interface circuit receiving a reply from the remote device in response to the previously sent command, sending from the interface circuit to the remote device another command regarding the operation specified in another stored operation data block;

(e) repeating step (d) until commands regarding the operations specified in all the stored data blocks have been sent and replies thereto have been received; and (f) then the interface circuit transmitting a second message packet containing the replies over the network to the controlling apparatus.

5. In a communications network having a programmable controller coupled to the network and at least one sensor coupled to the network by an interface circuit; a method for controlling the interface circuit and sensor comprising:

(a) transmitting over the network to the interface circuit a message packet which contains a return code field, a command field, a field for sensor status, a field for interface circuit status, a sequence number field and sensor number field;

(b) the interface circuit upon receipt of the message packet, examining the command field to determine if the command is for the interface circuit or a sensor coupled to the interface circuit;

(c) if the examined command is for the sensor, the interface circuit responds by sending an instruction to the sensor regarding a task specified in the command field;

(d) if the examined command is for the interface, the interface circuit responds by performing a task specified in the command field;

(e) thereafter the interface circuit gathering data from either itself or the sensor in response to the performance of the task;

(f) the interface circuit forming a reply message packet containing the gathered data and having a return code field, a command field, a sensor status field, an interface status field, a sequence number field, and a sensor number field; and (g) the interface circuit transmitting the reply message packet on the network.

6. The method as recited in claim 5 wherein the contents of the sequence number field in the reply message packet are the same as the contents of the sequence number field in the message packet transmitted in step (a).

7. The method as recited in claim 5 wherein the contents of the sensor number field in the reply message packet are the same as the contents of the sensor number field in the message packet transmitted in step (a).

8. The method as recited in claim 5 wherein a plurality of sensors are coupled by the interface circuit to the network and wherein step (c) includes determining from the sensor number field the particular sensor to which the instruction should be sent.

9. The method as recited in claim 5 wherein the message packet transmitted in step (a) further includes a plurality of data blocks which specify separate operations to be performed by the sensor.

10. The method as recited in claim 9 wherein steps (c) and (d) are repeated to send instructions to and receive responses from the sensor for each operation specified in the plurality of data blocks.

11. The method as recited in claim 10 wherein the reply message packet also includes data regarding the responses received from the sensor.

* * * * *